Figure 1:
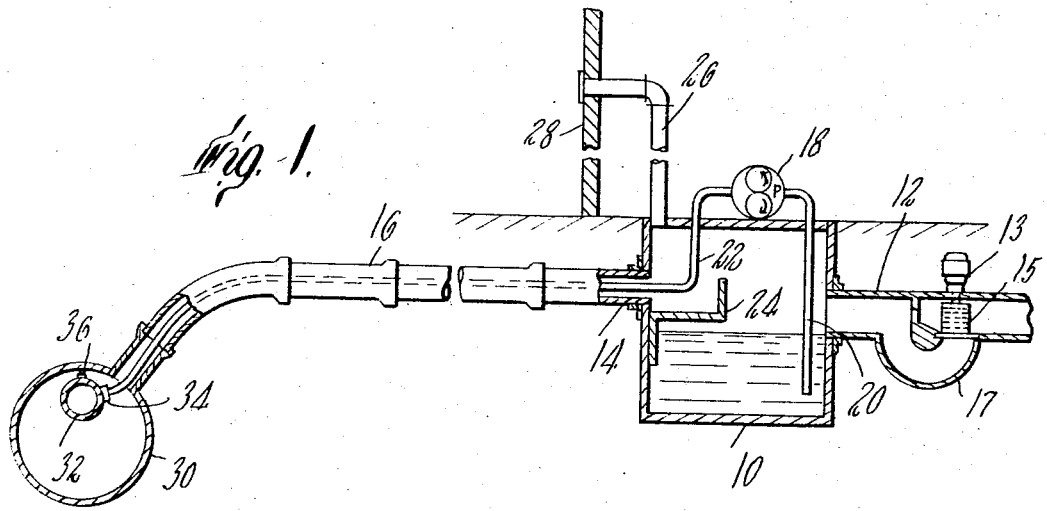

3,366,339
CONVERTED SEWER SYSTEM
Gordon M. Fair, 29 Robinson St.,
Cambridge, Mass. 02138
Filed Nov. 26, 1965, Ser. No. 509,711
The entire term of the patent has been
dedicated to the public
6 Claims. (Cl. 241—101)

This invention relates to sewage systems and particularly to a novel system for separating sanitary sewage (domestic, mercantile, industrial) from stormwater in previously combined systems of sewerage. The term "sanitary sewage" is used to designate water discharged from water fixtures and collected as wastewater after serving its primary purpose, as well as water serving the purpose of carrying away waste matters from households, mercantile, commercial and industrial establishments.

The U.S. Department of Health, Education, and Welfare, in its recent publication, "Pollutional Effects of Stormwater and Overflow from Combined Sewer Systems," November 1964, estimates that 59 million people in the United States live in communities with combined systems of sewerage. The main and branch sewers of such systems are usually designed to accommodate not only sanitary sewage but also the runoff from rainstorms. Because it is impractical to carry the occasional stormwater-swollen flows, which are a great many times the volume of sanitary sewage, to treatment plants and treat them before discharging them into nearby watercourses such as rivers, lakes, and tidal estuaries, intercepting sewers built to intercept sanitary sewage flows before they can spill into water courses are seldom designed for a flow capacity much beyond the maximum dry weather flow. This dry weather flow normally consists only of the sanitary sewage and water leaching into sewers from wet ground, or coming from street-washing, lawn-sprinkling, and other dry-weather operations. Intercepters are seldom given a flow capacity in excess of 3 times the dry-weather flow in United States practice. At times of storms, the excess flow above the intercepter capacity is overflowed, usually directly to a watercourse. This overflow contains raw sewage and the amount of raw sewage discharged in this manner into the streams may, in the course of a year, amount to as much as or more than 5% of the total annual sanitary sewage.

The extensive pollution of waters from this source is a serious problem to which, the above publication concludes, the ultimate answer is complete separation of sanitary sewage flow from stormwater flow. When new sewage disposal systems are being installed the provisions of completely separate lines for sanitary sewage leading to the treatment or disposal works and for stormwater leading to the watercourse is economically feasible and modern systems are normally of this type. However, the provision of a conventional separate sanitary sewage system in communities presently employing a combined system would be tremendously expensive, estimated in the above publication to cost the nation 20 to 30 billion dollars.

The object of this invention is to provide a novel apparatus system by which combined sewage systems may be converted to separate sanitary sewage and stormwater disposal systems at greatly reduced cost and without the inconvenient and costly opening up of streets and sidewalks as required by prior proposals.

In accordance with the invention, each building having an existing sanitary sewage connection to a combined sewer is provided with a tank, usually in the basement, in which all sanitary sewage from the building is received. The tank is provided with a pump or pumping system, preferably including or preceded or followed by a shredder or system of shredding. The pump or pumping system forces the sewage through a pipe which extends through the existing house or other building sewer conduit which is connected to the combined sewer, and is of substantially smaller diameter than such conduit. This pipe is preferably made of flexible plastic or otherwise so constructed that it may be fished through the existing conduit to the sewer and will accommodate the pressurized flow of sewage from the pump. Within the combined sewer there is laid a sanitary sewage receiving pipe to which the sanitary sewage discharge pipe from the pump of each unit served by the sewer pipe is connected. This receiving pipe is of a construction such as asbestos cement suitable for containing pressurized flow of sewage and of sufficient diameter to contain the sanitary sewage flow from all sources connected thereto, but of substantially smaller diameter than the existing combined sewer pipe or conduit within which it is laid. The sanitary sewage receiving pipe within the existing combined sewer extends to the nearest intrecepter leading to the sewage treatment or disposal works and preferably discharges into such intercepter, although it may, if desired, be continued through such intercepter to the works. Such receiving pipe may be laid, hung or otherwise supported within the existing combined sewer readily and without the necessity of opening up the streets or sidewalks above the sewer. If the sewer at the point at which the existing sewage conduit discharges to it is too small to permit access of a workman to connect the sanitary sewage discharge pipe from the unit to the receiving pipe within the sewer, the discharge pipe is continued within the sewer and fished to the nearest manhole, normally not more than 200 feet away, where the connection may be readily made.

It will be seen that the invention makes possible a completely separate sanitary sewage disposal system which may be provided within an existing combined sewer system without opening up the ground over the existing system. This is accomplished without the necessity of new piping other than a single, relatively small sewer pipe in each existing combined sewer line for receiving the sanitary sewage from each source discharging to said line and which need extend only to the nearest intercepter leading to the sewage treatment plant, and the relatively small pipe extending from each source through the existing building sewer conduit to the sanitary (small) sewer pipe in each existing combined sewer. The saving in cost thereby effected, as compared with laying a new sanitary sewer system in the conventional way from each unit to the treatment plant, far exceeds the cost of the additional equipment which such a conventional separate gravity flow system would not require, such as the receiving tank, pump and shredder. In addition, the pressurized system which the invention provides at much lower cost, has distinct advantages over a gravity flow system.

To the cost saving above mentioned should be added the smaller diameter of piping required as compared with a separate gravity system and the fact that, due to its protection by housing within an existing sewer system, it can be of less costly construction than that of piping which is laid directly under ground. For example, the sanitary sewage piping according to this invention may be of the order of ⅛ to ¼ the diameter of the existing sewer connections and much of it may be made of inexpensive plastic material.

At times of storms my system disposes of the stormwater to the watercourses as before but free of sanitary sewage or with not more than a trace thereof which may be occasioned by overflow from safety valves or other control outlets provided in the pressurized sanitary sewage system or from overflow devices provided in the tank within the premises.

Figure 2:
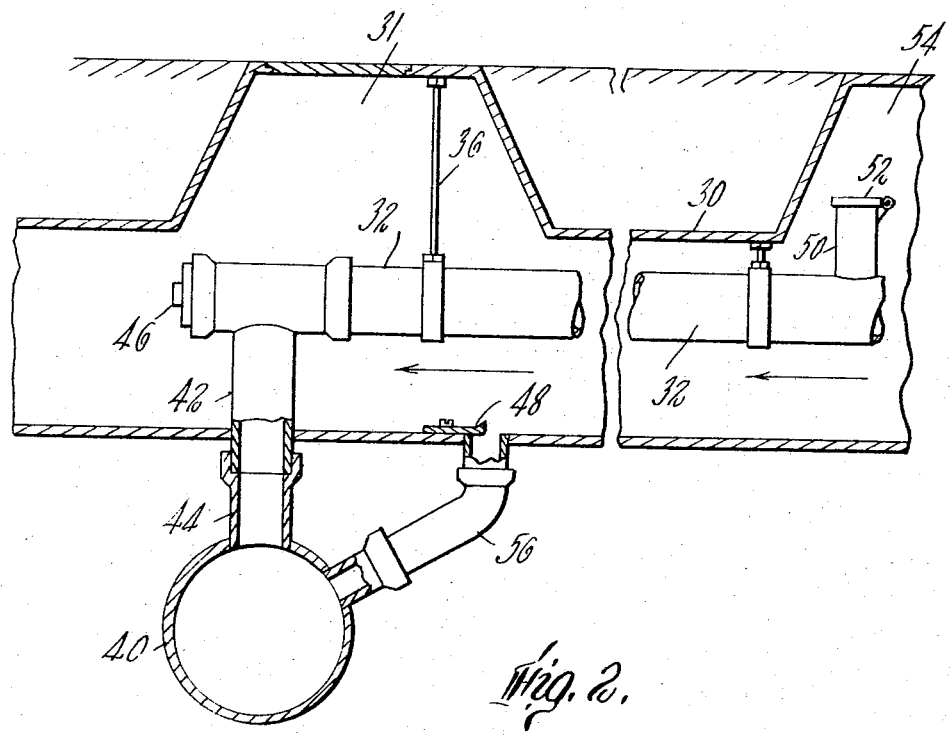

The invention will be further described in connection with the accompanying drawing wherein:

FIG. 1 illustrates in vertical cross-section a portion of a house or similar unit and sewer connections to it which have been modified according to the invention to convert the system from combined to separated sanitary sewage and stormwater disposal; and FIG. 2 is a view similar to FIG. 1 of the existing combined sewer now serving as a storm sewer and the sanitary sewer showing a junction with an intercepter leading to the sewage treatment or disposal works, and also showing a safety valve in the pressurized line.

Referring to FIG. 1 of the drawing, the sewer connections for only one house or similar unit are shown, it being understood that such connections are essentially duplicated for each unit served by the sewer pipe up to the nearest intercepter leading to the sewage treatment plant.

Referring to the drawing, the sanitary sewage collecting tank for the house or other unit is shown at 10 located at a low level such as on or below the basement floor, having an inlet 12 to the existing sewage outflow pipe from the unit and an overflow outlet 14 connected to the usually underground conduit 16 which connects the unit to the existing combined sewer pipe 30. Inlet 12 is shown as preceded by a shredder 13 provided with a cutting screen 15 which discharges the shredded sewage through elbow 17 to inlet 12. Above tank 10 is located a pump 18, diagrammatically indicated as a gear pump, the motor for which is not shown. The pressure required of the pump is not great, and may be such as to produce a flow rate of the order of six feet per second as compared with the normal gravity flow rate of the order of one to four feet per second.

The pump 18 may be a gear pump as indicated, or may be a centrifugal or other mechanical pump or an ejector supplied with compressed air from a compressor, such ejector being advantageous from the standpoint that the compressed air injects oxygen into the sewage which aids in keeping it fresh in the closed pressurized system. The pump may be a system of pumps in series or in parallel. The shredder may be of any suitable type and may have a single rotary cutting screen or similar device or may be a system of such devices arranged in series or in parallel. When a shredder or shredder system is used it preferably precedes the pump or pumping system to avoid fouling the pump or pumps with non-comminuted sewage, but it may follow the pump where this is not a problem. The shredder may be dispensed with in cases where the maximum particle size of the sewage is not such as would be expected to cause plugging but should otherwise usually be employed. The shredder or shredder system may be located in line 20 immediately preceding pump 18 and be operated by the same motor as the pump, as may be preferable with smaller units.

The inlet to the pump as shown is through pipe 20 which extends close to the bottom of the tank and the pump discharges to a pipe 22 which is of smaller diameter than conduit 16 and extends into tank 10 and out through conduit 16 to the main sewer pipe 30. As previously explained, pipe 22 is of a construction such that it can be fished through conduit 16 to main sewer pipe 30 without the necessity of opening the ground above the conduit or sewer pipe, and may be preferably of flexible plastic or latex composition similar to that utilized in garden hose. A trough 24 supported on the wall of tank 10 below outlet 14 extends above the outlet to provide an emergency overflow outlet for the sewage to conduit 16 in the event tank 10 should for some reason fill above its anticipated maximum contents level. If the system is not adequately vented through the existing combined sewer and pipes 16 and 12, an air vent and inlet pipe 26 may be provided which extends from the top of tank 10 to some point above ground as in the building wall 28, where it may have shielded exposure to the atmosphere. Pipe 26 may also have a branch connection to the inlet side of comminuter 13 in order to insure complete venting of the system.

Tank 10 will usually be equipped with controls (not shown) for governing the operation of the pump, such as one or more float valves or sensors for starting the unit when the contents of the tank reach a desired maximum storage level and stopping it when the tank is emptied to a desired minimum level. Controls for operating the shredder during times of flow, also not shown, will also normally be provided. There may also be included time controls which permit the pump to operate only at certain times unless an emergency level is reached in the meantime. By staggering operating times of the various units served by main sewer pipe 30 the daily sewage flow to the treatment plant can be regularized and overloads prevented. If the pump 18 is a gear pump as shown, it will prevent backflow from pipe 22. If another type of pump is used which does not prevent backflow, a backflow control device such as a check valve will ordinarily be provided for the purpose.

It should be noted that conduit 16, except for the small volume thereof occupied by pipe 22, is now available to conduct to sewer pipe 30 waste water from roofs and gutters, and from area and cellar drains and the like. These may now be safely connected to this conduit whereas in the former combined system this was not normally feasible due to the danger of overloading the conduit and interfering with sewage flow from the house or other unit in times of storms. The end of conduit 16 in tank 10 may be provided with the usual check valve (not shown) for preventing backflow therefrom into the tank.

Within main sewer pipe 30 is located the sanitary sewage receiving pipe 32 to which pipe 22 is connected at 34. Pipe 32 is made of material suitable for pressurized flow at the pressures involved, such as asbestos cement. Pipe 32 is shown suspended by hangers as at 36 within pipe 30 but where access to the interior of pipe 30 may not readily be had, pipe 32 may be simply pushed or pulled through and laid in pipe 30 from manhole to manhole. Likewise, when access may not readily be had for connecting pipe 22 to pipe 32 at the point of entry of pipe 22 into sewer 30, pipe 22 may be fished to the nearest manhole and the connection made there.

FIG. 2 shows at the left the sewer system of FIG. 1 at the junction with the nearest intercepter 40, which is a gravity flow pipe discharging to the sanitary sewage treatment or disposal works. Pressure pipe 32 terminates at this junction, discharging through connecting pipe 42, into an inlet 44 to interceptor 40. A cleanout plug 46 is desirably provided at the end of pipe 32. Sewer pipe 30 continues beyond the junction to discharge as before to the existing outfall at times when it contains stormwaters received from its source inlets.

Normally, it is desirable to provide a connection between intercepter 40 and main sewer 30 so that any emergency sanitary sewage overflows from the pressurized sanitary sewage system will transfer to the intercepters. The old connections may be retained or new connections provided. In the instance illustrated in the drawing existing connections between main sewer and intercepter of so-called "leaping weir" type are retained, the adjustable weir plate 48 thereof being left open sufficiently to cause the small amount of dry weather flow that may be anticipated, due to leakages into the main sewer system and possible emergency overflow discharge thereto from the pressure system, to pass downwardly through inlet 56 to intercepter 40. Stormwater flows will in most part overflow the weir and pass on to the outfall, as indicated by the upper arrows. Desirably ready access will be provided to the connections to the intercepter, as by the manhole compartment 31 shown.

It will be understood that pressure pipe 32 may be provided at suitable intervals with emergency overload relief valves which will discharge into sewer pipe 30 to such extent as necessary to remove temporary overloads. Such a valve is shown at the right in FIG. 2 in the form of a vertically dispose pipe 50 opening at its base into pressure pipe 32 and closed at the top by a hinged cover 52. The upper part of pipe 50 extends into a compartment 54 which rises above the main sewer pipe 30 and may conveniently be a manhole. Under normal pressure and flow the sanitary sewage in pipe 32 will not rise to the top of pipe 50 and cover 52 will remain closed. If sufficient back pressure should develop in the pressure system due to overload or plugging, the sanitary sewage will rise to the top of pipe 50 and force open cover 52, escaping into compartment 54 and to main sewer pipe 30 until the condition is relieved, whereupon the cover 52 again closes under its weight. At times of storms the stormwater will not ordinarily rise above the cover 52 and so the relief system remains operable at such times.

While it will usually be satisfactory and less expensive to permit the sanitary sewage to discharge from the pressure pipe system into the existing intercepter system as shown, it may be desirable in some instances to continue the pressure system within the intercepters to the sewage treatment or disposal works.

I claim:

1. A sewage system for separately conducting stormwater to an outfall and sanitary sewage to a sewage treatment or disposal works comprising a first system of piping leading to an outfall, having inlets for stormwater and also having pipe connections from sources of sanitary sewage such as buildings, a second system of piping of substantially smaller diameter than the piping of said first system and housed within it for receiving pressurized sanitary sewage flow, said second system being normally closed to said outfall and having connections leading to said works, said second system being connected to receive pressurized sanitary sewage flow from said sources of sanitary sewage by means of pipe connections extending through said pipe connections of said first piping system, said sources of sanitary sewage including a storage tank for the sewage and pump means connected to withdraw sewage from said tank and to discharge it under pressure through said pipe connections of said second piping system.

2. A sewage system according to claim 1 wherein said first system of piping includes intercepters leading to said works and said second system of piping discharges to said intercepters.

3. A sewage system according to claim 1 which includes means for shredding the sewage before it is discharged into said second piping system.

4. A sewage system according to claim 1 wherein said pipe connections of said second piping system from said sources of sanitary sewage are of flexible material such that they may be readily fished through the piping of said first piping system.

5. A sewage system according to claim 1 wherein said tank is provided with means permitting emergency overflow to said pipe connections of said first piping system.

6. A sewage system according to claim 1 wherein said second piping system is provided with means permitting emergency overflow from said second piping system to said first piping system.

References Cited
UNITED STATES PATENTS

| | | | |
|---|---|---|---|
| 2,852,313 | 9/1958 | Mickel | 302—14 |
| 3,239,849 | 3/1966 | Liljendahl | 302—14 |

GERALD A. DOST, *Primary Examiner.*